US011539546B2

(12) United States Patent
Park

(10) Patent No.: US 11,539,546 B2
(45) Date of Patent: Dec. 27, 2022

(54) HOME APPLIANCES AND METHOD FOR CONTROLLING HOME APPLIANCES

(71) Applicant: LG ELECTRONICS INC., Seoul (KR)

(72) Inventor: Yun Sik Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 263 days.

(21) Appl. No.: 16/869,724

(22) Filed: May 8, 2020

(65) Prior Publication Data

US 2021/0152389 A1  May 20, 2021

(30) Foreign Application Priority Data

Nov. 14, 2019 (KR) ................. 10-2019-0145837

(51) Int. Cl.
| | |
|---|---|
| *H04L 12/28* | (2006.01) |
| *G06N 3/08* | (2006.01) |
| *G10L 15/16* | (2006.01) |
| *G10L 15/18* | (2013.01) |
| *G10L 15/22* | (2006.01) |
| *G06V 40/20* | (2022.01) |
| *G06K 9/62* | (2022.01) |
| *G06V 10/764* | (2022.01) |
| *G06V 10/82* | (2022.01) |
| *G06V 20/52* | (2022.01) |
| *G06F 3/16* | (2006.01) |

(52) U.S. Cl.
CPC ........... *H04L 12/282* (2013.01); *G06N 3/084* (2013.01); *G06V 40/20* (2022.01); *G10L 15/16* (2013.01); *G10L 15/18* (2013.01); *G10L 15/22* (2013.01); *H04L 12/2812* (2013.01); *H04L 12/2827* (2013.01); *G10L 2015/223* (2013.01); *G10L 2015/225* (2013.01); *G10L 2015/228* (2013.01); *H04L 2012/285* (2013.01)

(58) Field of Classification Search
None
See application file for complete search history.

(56) References Cited

U.S. PATENT DOCUMENTS

| | | | |
|---|---|---|---|
| 2011/0032072 A1* | 2/2011 | Han | H04L 12/2827 340/5.1 |
| 2018/0063685 A1* | 3/2018 | Han | H04W 4/12 |
| 2019/0340779 A1* | 11/2019 | Finkelstein | G06N 3/0445 |
| 2020/0110532 A1* | 4/2020 | Mani | G06V 40/113 |
| 2020/0365150 A1* | 11/2020 | Jeon | G06F 11/3013 |

\* cited by examiner

*Primary Examiner* — John A Follansbee
*Assistant Examiner* — Kamal M Hossain
(74) *Attorney, Agent, or Firm* — Birch, Stewart, Kolasch & Birch, LLP

(57) ABSTRACT

A method of controlling a home appliance which operates in an Internet of Things environment through a 5G communication network and which is performed using a neural network model generated by machine learning, including determining whether there is a user in the vicinity of the home appliance, capturing a motion of the user using a vision sensor based on a determination that there is a user in the vicinity of the home appliance, identifying an intention of the user based on the captured motion, and activating a speech module of the home appliance based on the intention of the user.

17 Claims, 8 Drawing Sheets

HOME APPLIANCES AND METHOD FOR CONTROLLING HOME APPLIANCES

CROSS-REFERENCE TO RELATED APPLICATION

This present application claims the priority benefit of Korean Patent Application No. 10-2019-0145837, filed in the Republic of Korea on Nov. 14, 2019, the entire disclosure of which is incorporated herein by reference.

BACKGROUND

1. Technical Field

The present disclosure relates to a home appliance and a method for controlling a home appliance in which the home appliance is controlled by recognizing a user through a vision sensor.

2. Description of Related Art

A user interface for controlling electronic devices has evolved from a switch and a button to a keypad and a touch display, and recently, in accordance with the development of speech recognition technology, control of the electronic device by speech of the user has been applied to products.

Speech recognition technology is a technology that enables a machine device to understand speech uttered by a person and thereby provide a service desired by the person, which accordingly enables smooth interaction between a user and the machine device.

A speech recognition device using such speech recognition technology initiates speech recognition only when a designated command is inputted. This is to prevent power and processing resources from being excessively consumed when a function for speech command recognition is constantly activated, and to prevent speech recognition that a user does not intend from occurring.

A designated command to initiate speech recognition is referred to as a wake-up word. When the spoken utterance of the user includes the wake-up word, the speech recognition device recognizes the wake-up word and activates a speech recognition module, and recognizes a speech command of the user so as to respond to the command.

Generally, the speech recognition device is designed so as not to activate the speech recognition module without a wake-up word, and not to respond to surrounding sound. Therefore, it may be inconvenient for the user to utter the wake-up word whenever he or she wants to transmit a speech command to the device.

Therefore, there is a need for a technology that is capable of understanding when a user wants to interact with the machine via speech and activating the speech recognition function of the machine, even when the user does not use a wake-up word.

Further, issues may arise during operation of devices in which a plurality of components operate therein. Therefore, there is a need for a technology capable of addressing such issues by notifying the user thereof in a timely manner, even when the user does not actively inquire.

The above-described related art is technical information that the inventor holds for deriving the present disclosure or is acquired in the derivation process of the present disclosure, and is not necessarily a known technology disclosed to the general public before the application of the present disclosure.

SUMMARY OF THE INVENTION

Embodiments of the present disclosure are directed to addressing an issue associated with some related art in which if a user does not utter a wake-up word, even when the user wants to interact with a machine via speech, a speech recognition function of the machine is not activated, and communication through speech recognition thus cannot be performed.

Embodiments of the present disclosure are further directed addressing an issue in which, in order to recognize a speech command of the user without using a wake-up word, a speech recognition function of a machine needs to be activated at all times, which results in excessive power and processing resource consumption.

Embodiments of the present disclosure are still further directed to addressing an issue in which, when a speech recognition function is activated at all times, the machine may respond to the voice of the user even when the user does not intend to interact with the machine via speech.

Embodiments of the present disclosure are still further directed to addressing an issue in which, when a separate wake-up word is not uttered, even when the user wants to interact with the machine, the machine cannot automatically understand or identify the intention of the user to activate the speech recognition function.

Embodiments of the present disclosure are still further directed to addressing an issue associated with some related art in which, in order to control the device through consecutive speech commands, the wake-up word needs to be uttered for each command, and in an environment in which the device is operated through consecutive commands, the wake-up word needs to be inserted at every section, such that the user cannot be provided with a natural experience.

Embodiments of the present disclosure are still further directed to addressing a problem associated with some related art in which, even when an issue arises during the operation of the device, the issue cannot be notified to a user who is not in the vicinity (e.g., predetermined area around the device) of the device when the issue arises or a user who enters the vicinity of the device after a long time has elapsed since the issue arose.

A method for controlling a home appliance according to an embodiment of the present disclosure may determine whether a user is in the vicinity of the home appliance and whether the user has an intention to manipulate the home appliance through image information collected using a sensor, and accordingly control the home appliance to be in a state in which the home appliance can be manipulated by speech.

In the method for controlling a home appliance according to an embodiment of the present disclosure, when an issue arises during the operation of the home appliance, an operation history of the home appliance until the issue arose is stored, after which a user who is not in the vicinity of the home appliance may be notified of the issue through a communication network and a user who is found in the vicinity of the home appliance may be notified of the issue and the operation history of the home appliance until the issue arose.

A method for controlling a home appliance according to an embodiment of the present disclosure may include determining whether there is a user in the vicinity of the home appliance, capturing a motion of the user by a vision sensor based on a determination that there is a user in the vicinity of the home appliance, identifying an intention of the user based on the captured motion, and activating a speech module of the home appliance based on the intention of the user.

Further, the method for controlling a home appliance according to this embodiment of the present disclosure may further include, before the determining, recognizing an event occurring during the operation of the home appliance and storing information about the event (e.g., in a memory of the home appliance), and the activating of a speech module of the home appliance may include generating information about the event as a voice signal.

Here, the event may include an error occurring during the operation of the home appliance, and the information about the event may include information about a history of operations performed by the home appliance until the time at which the error occurred. After the recognizing of an event, the method may further include determining an error type and searching for a solution for the error type.

Further, the activating of a speech module of the home appliance may further include generating the information about a history of the operations performed by the home appliance until the time at which the error occurred and the solution according to the error type as a voice signal.

Here, the searching for a solution for a predetermined error type may include providing a query about a solution for the error type to an external server that communicates with the home appliance, and receiving a solution for the predetermined error type from the external server.

Further, according to the method for controlling a home appliance according to this embodiment of the present disclosure, the event may include completion of the operation of the home appliance, and the information about the event may include time information about a time at which the operation of the home appliance was completed.

In this case, the activating of a speech module of the home appliance may further include determining an operation to be recommended to the user based on a time elapsed since the time at which the operation of the home appliance was completed and generating the operation to be recommended as a voice signal.

Further, the method for controlling a home appliance according to this embodiment of the present disclosure may further include, before the determining, recognizing an event occurring during the operation of the home appliance and storing information about the event, and after the determining, transmitting the information about the event to a user terminal which is registered in advance based on a determination that there is no user in the vicinity of the home appliance.

Further, the method for controlling a home appliance according to this embodiment of the present disclosure may further include, after the transmitting, determining whether the user has read the information about the event transmitted to the user terminal.

In this case, the generating of a voice signal may include generating the information about the event as a voice signal in response to a determination that the user has not read the information about the event.

Here, the identifying of an intention of the user may include identifying the intention of the user using a neural network model trained to determine whether the user intends to manipulate the home appliance based on a motion of the user in the vicinity of the home appliance.

Further, the method for controlling a home appliance according to this embodiment of the present disclosure may further include, after the activating, determining that identifying of the intention of the user using the neural network model has failed based on a command not being received by the home appliance for a predetermined time, and updating the neural network model.

A computer-readable recording medium for controlling the home appliance according to another embodiment of the present disclosure may be a computer-readable recording medium in which a computer program configured to execute any one of the above-described methods is stored.

Further, a home appliance according to another embodiment of the present disclosure may include a cabinet which forms an exterior of the home appliance, a door installed to open or close a passage through which an object is loaded into the cabinet, a camera (e.g., vision sensor) disposed to capture an image of an outside of the home appliance, a speaker configured to output a voice signal generated in a speech module in the home appliance, one or more processors (e.g., controllers) configured to control an operation of the home appliance, and a memory connected to the one or more processors.

The memory may store an instruction configured to, when executed by the processor (e.g., controller), cause the processor to determine whether there is a user in the vicinity of the home appliance, capture a motion of the user by a camera based on a determination that there is a user is the vicinity of the home appliance, identify an intention of the user based on the captured motion, and activate a speech module of the home appliance in accordance with the intention of the user.

Further, a home appliance according to this embodiment of the present disclosure may further include a proximity sensor configured to sense whether there is a user in the vicinity of the home appliance, the camera may be disposed on the door to face a front direction of the home appliance, and the camera may be configured to be activated in response to the proximity sensor sensing that there is a user in the vicinity of the home appliance.

The above and other aspects, features, and advantages of the present disclosure will become apparent from the detailed description of the following aspects in conjunction with accompanying drawings.

According to embodiments of the present disclosure, a machine device can activate a speech recognition function by appropriately determining when a user wants to interact with the device via speech even when the user does not use a wake-up word. Accordingly, an environment in which the user can more naturally interact with the device via speech can be provided.

Further, according to the embodiments of the present disclosure, while the speech recognition function of the device is inactive at ordinary times, the speech recognition function of the device is automatically activated when the user wants to interact with the device via speech. Accordingly, a speech recognition service can be provided by the device while lowering power consumption and saving processing resources.

Further, according to the embodiments of the present disclosure, the speech recognition function is inactive at ordinary times, and is only activated when the user intends to interact with the device via speech. Accordingly, an erroneous operation when the user does not intend interact with the device via speech may be prevented.

Furthermore, according to the embodiments of the present disclosure, even when a separate wake-up word is not uttered, it can be determined when the user wants to interact with the machine. Accordingly, the user and the machine can naturally interact with each other via speech.

According to the embodiments of the present disclosure, the device can be operated through consecutive commands without the user having to repeatedly input the wake-up word. Accordingly, the user can be provided with a natural experience.

Further, according to the embodiments of the present disclosure, when an issue arises during the operation of the device, a user who is not in the vicinity of the device can be immediately notified of the issue, and a user who enters the vicinity of the device can be notified of an operation history of the device until the issue arose. Accordingly, the issue arising in the device can be effectively solved.

The effects of the present disclosure are not limited to those mentioned above, and other effects not mentioned can be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
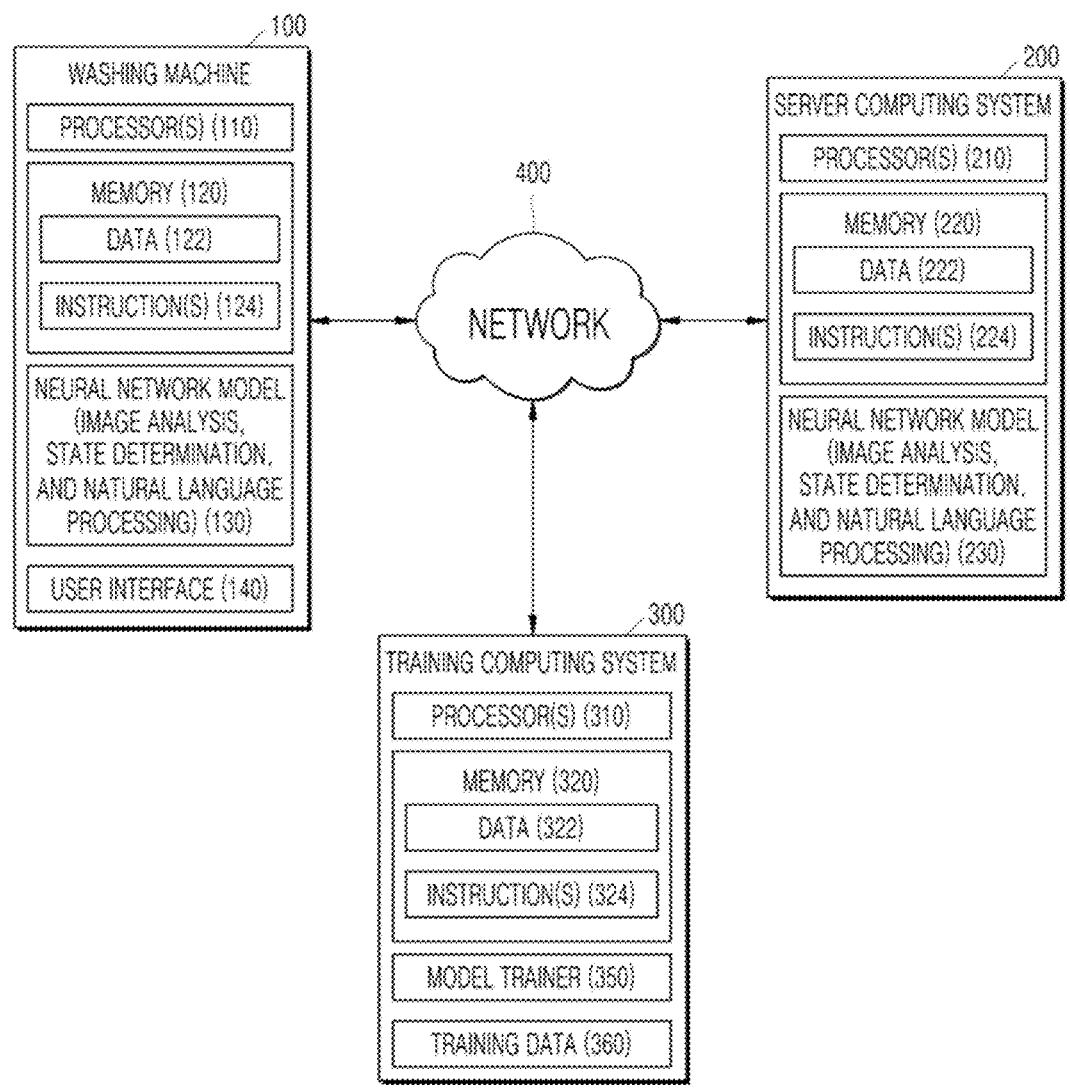
FIG. 1 is a diagram of an environment in which a washing machine, as an example of a home appliance according to an embodiment of the present disclosure, operates.

Advantages and features of the present disclosure and methods of achieving the advantages and features will be more apparent with reference to the following detailed description of example embodiments in connection with the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The embodiments disclosed below are provided so that this disclosure will be thorough and complete and will fully convey the scope of the present disclosure to those skilled in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. It must be noted that as used herein and in the appended claims, the singular forms "a," "an," and "the" include the plural references unless the context clearly dictates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or a combination thereof. Furthermore, these terms such as "first," " "second," and other numerical terms, are used only to distinguish one element from another element. These terms are generally only used to distinguish one element from another.

Hereinafter, embodiments of the present disclosure will be described in detail with reference to the accompanying drawings. Like reference numerals designate like elements throughout the specification, and overlapping descriptions of the elements will be omitted.

A home appliance according to an embodiment of the present disclosure may include all home appliances which perform a series of operations after inserting an object into a device, such as a washing machine, a dryer, a dishwasher, an oven, a microwave, and a clothing care system. However, for convenience of description, the embodiments of the present disclosure will be described using a washing machine which is mainly used in a home as an example.

FIG. 1 is an exemplary diagram of an environment in which a washing machine, as an example of a home appliance according to an embodiment of the present disclosure, operates.

An environment for performing a washing machine control method according to an embodiment of the present disclosure may include a washing machine 100, a server computing system 200, a training computing system 300, and a network 400 for enabling communication between these components.

Further, the washing machine 100 may support object-to-object intelligent communication such as Internet of things (IoT), Internet of everything (IoE), and Internet of small things (IoST), and may also support machine to machine (M2M) communication and device to device (D2D) communication.

The washing machine 100 may determine an image resolution enhancement method by using big data, artificial intelligence (AI) algorithms, and/or machine learning algorithms in a 5G environment connected for the IoT.

The washing machine 100 may include one or more processors 110 and a memory 120.

The one or more processors 110 may include any type of device capable of processing data, such as an MCU. Here, the "processor" may refer to, for example, a data processing apparatus embedded in hardware and having physically structured circuits in order to perform functions represented as a code or command included in a program.

Examples of the data processing device embedded in hardware may include a microprocessor, a central processing unit (CPU), a processor core, a multiprocessor, an application-specific integrated circuit (ASIC), and a field programmable gate array (FPGA), but the scope of the present disclosure is not limited thereto.

The memory 120 may include one or more non-transitory storage media such as RAM, ROM, EEPROM, EPROM, a flash memory device, or a magnetic disk. The memory 120 may store instructions 124 that cause the user terminal 100 to perform operations when executed by data 122 and processors 110.

In addition, the washing machine 100 may include a user interface 140 to receive commands from the user and to transmit output information to the user. The user interface 140 may include various input tools, such as a keyboard, a mouse, a touch screen, a microphone, and a camera; and various output tools, such as a monitor, a speaker, and a display.

A user may select an area of an image to be processed in the washing machine 100, through the user interface 140. For example, through the mouse, the keyboard, or the touch screen, the user may select an object or an area for which he or she wants to improve the resolution from a low-resolution image. Further, the user may perform a pinch-in or pinch-out operation on the touch screen to generate a command to reduce or enlarge the image.

In one embodiment, the washing machine 100 may store or include a neural network model 130 to which artificial intelligence technology is applied, such as an image analysis model, a washing machine status determining model, or a natural language processing model. For example, the neural network model 130 to which artificial intelligence technology is applied may be various learning models such as a convolutional neural network, a generative adversarial neural network, or other types of machine learning models.

Artificial intelligence (AI) is an area of computer engineering science and information technology that studies methods to make computers mimic intelligent human behaviors such as reasoning, learning, and self-improving.

In addition, the artificial intelligence does not exist on its own, but is rather directly or indirectly related to a number of other fields in computer science. In recent years, there have been numerous attempts to introduce an element of the artificial intelligence into various fields of information technology to address issues in the respective fields.

Machine learning is an area of artificial intelligence that includes the field of study that gives computers the capability to learn without being explicitly programmed.

Specifically, machine learning may be a technology for researching and constructing a system for learning, predicting, and improving its own performance based on empirical data and an algorithm for the same. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

A decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

An ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms "artificial neural network" and "neural network" may be used interchangeably herein.

An ANN may include a number of layers, each including a number of neurons. Furthermore, the ANN may include synapses that connect the neurons to one another.

An ANN may be defined by the following three factors: (1) a connection pattern between neurons on different layers; (2) a learning process that updates synaptic weights; and (3) an activation function generating an output value from a weighted sum of inputs received from a lower layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

A general single-layer neural network is composed of an input layer and an output layer.

In addition, a general multi-layer neural network is composed of an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

A deep neural network with a plurality of hidden layers between the input layer and the output layer may be the most representative type of artificial neural network which enables deep learning, which is one machine learning technique.

An ANN may be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An ANN trained using training data can classify or cluster inputted data according to a pattern within the inputted data.

Throughout the present specification, an artificial neural network trained using training data may be referred to as a trained model.

Hereinbelow, learning paradigms of an ANN will be described in detail.

Learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regression, and a function that predicts and outputs the class of an input vector may be referred to as a classifier.

In supervised learning, an artificial neural network may be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be input to an artificial neural network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the ANN may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, an AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves inferring the label of unlabeled training data, and then using this inferring label for learning. This technique may be used advantageously when the cost associated with the labeling process is high.

Reinforcement learning may be based on a theory that given the condition under which a reinforcement learning agent may determine what action to choose at each time instance, the agent may find an optimal path to a solution solely based on experience without reference to data.

Reinforcement learning may be performed mainly through a Markov decision process (MDP).

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size. In SGD, a momentum and Nesterov accelerate gradient (NAG) are methods for increasing optimization accuracy by adjusting a step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

The neural network model 130 to which artificial intelligence technology as described above is applied may be generated by a training step by the training computing system 300, or may be stored in the server computing system 200 and then transmitted to the user terminal 100 through the network 400.

The neural network model 130 may be a trained model trained to analyze images around the washing machine 100, a trained model trained to determine an operation state of the washing machine 100, or a trained model trained to process speech received from the user as natural language. Here, the training method may be performed by a generative adversarial neural network model or reinforcement learning.

Generally, the neural network model 130 may be stored in the washing machine 100 in a state in which the neural network model 130 can be applied during the operation of the washing machine 100, having completed the training step in the training computing system 300. However, the neural network model 130 may be updated or upgraded in the washing machine 100 through additional training.

The neural network model 130 stored in the washing machine 100 may be some among models generated in the training computing system 300, and if necessary, new neural network models may be generated in the training computing system 300 and transmitted to the washing machine 100.

As another example, the neural network models are not stored in the washing machine 100 but are stored in the server computing system 200, and may provide functions required for the washing machine 100 as a web service.

The server computing system 200 may include processors 210 and a memory 220, and may generally have greater processing power and memory capacity than the washing machine 100. Therefore, in accordance with the system implementation, a heavy neural network model 230 which requires more processing power for application may be stored in the server computing system 200 and a light neural network model 130 which requires less processing power for application may be stored in the washing machine 100.

The washing machine 100 may select an appropriate neural network model according to a processing target, among various neural network models.

In an example, when it is necessary to understand or identify the intention of a user in the vicinity of the washing machine, the washing machine 100 may select a neural network model trained to analyze the image of the user in the vicinity obtained by a camera to determine whether the user intends to operate the washing machine.

In another example, when it is necessary to determine an event occurring in the washing machine 100, the washing machine 100 may select a neural network model trained to analyze an operation parameter of the washing machine 100 to determine the state of the washing machine.

In still another example, the washing machine 100 may select a neural network model trained to perform natural language processing to appropriately respond to speech inputted by the user.

The neural network models 130 and 230 included in the washing machine 100 or the server computing system 200 may be neural network models generated by the training computing system 300.

The training computing system 300 may include one or more processors 310 and a memory 320. In addition, the training computing system 300 may include a model trainer 350 and training data 360 for training machine learning models.

The training computing system 300 may create a plurality of neural network models based on the training data 360 through the model trainer 350.

Figure 2:
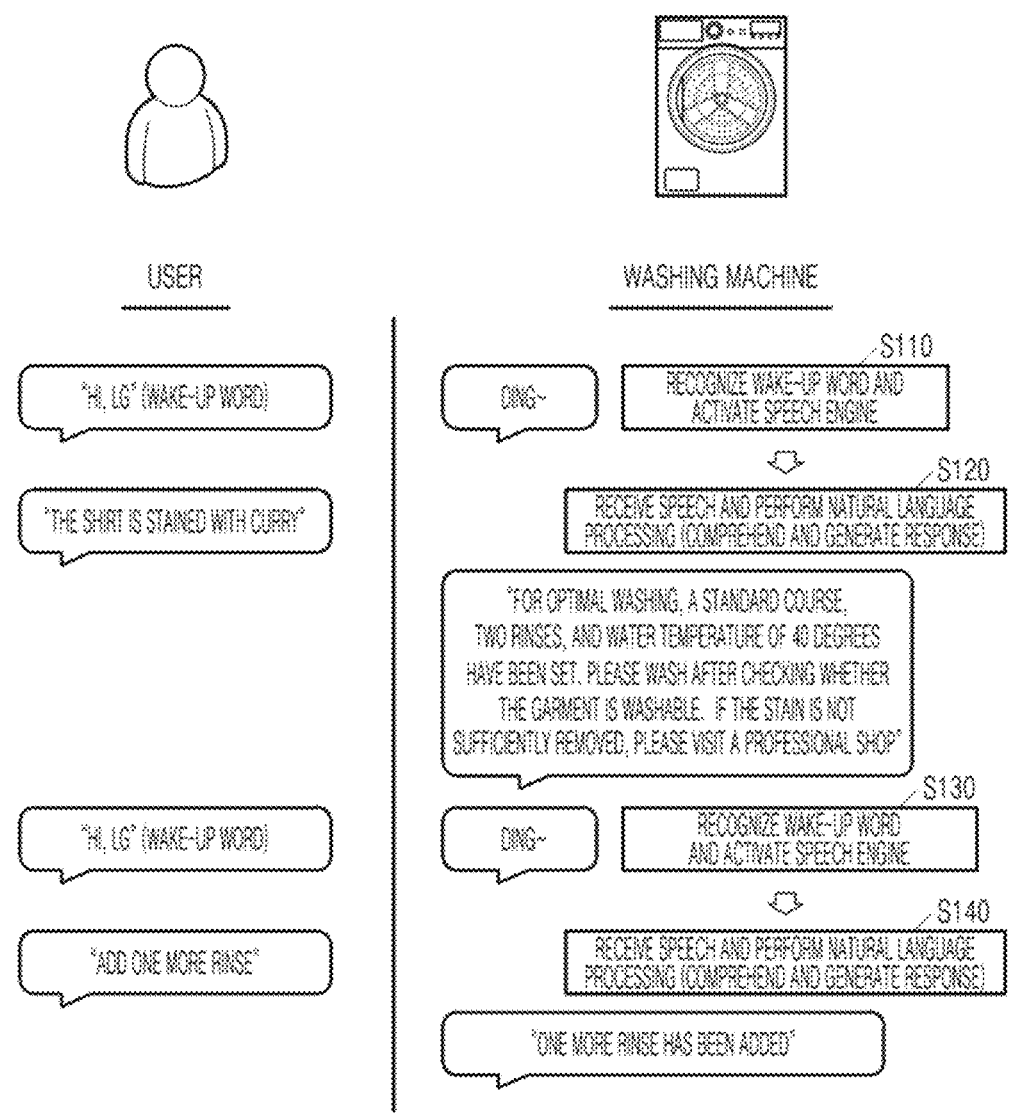
FIG. 2 is a view for explaining an example in which a user interacts with a washing machine having a speech recognition function via speech.

FIG. 2 is a view for explaining an example in which a user interacts with a washing machine having a speech recognition function via speech.

The user may provide a query about a washing condition to the washing machine 100 or control an operation of the washing machine 100 via speech.

As illustrated in FIG. 2, in order to control the washing machine 100 via speech, the user first needs to utter a predetermined wake-up word such as "Hi, LG". In order to recognize the uttered wake-up word and recognize additional speech from the user, the washing machine 100 may activate a speech engine (S110) (e.g., a speech engine processor) and notify the user that the speech engine is activated through a sound such as "ding".

The speech engine may also be referred to as a speech module. The speech engine may be configured to perform an overall process related to natural language processing, including functions of converting speech into text, figuring out a meaning of the text, searching for an appropriate response for a command or a query of the text, generating a signal related to the searched response, and converting text of the searched response into speech.

In one embodiment, the speech engine may be a processor for natural language processing, and in another embodiment the speech engine may be implemented as software for natural language processing.

A user who has confirmed that the speech engine is activated may indirectly inquire about washing conditions by saying "The shirt is stained with curry". The washing machine 100 may receive the speech of the user and generate an appropriate corresponding operation and response after identifying the meaning of the speech through the neural network model for natural language processing (S120).

The washing machine 100 which analyzes the speech of the user "The shirt is stained with curry" through the natural language processing may determine an optimal washing course through a washing course determining neural network trained in advance or a washing algorithm programmed in advance. Further, the washing machine 100 may activate the speech module to generate an explanation for a determined washing course as a voice signal. For example, the washing machine 100 may generate a response of "For optimal washing, a standard course, two rinses, and water temperature of 40 degrees have been set. Please wash after checking whether the garment is washable. If the stain is not sufficiently removed, please visit a professional shop."

When the user wants to change the above washing course via a speech command, the user needs to utter a wake-up word again to activate the speech engine of the washing machine 100. The washing machine 100 may recognize the wake-up word and activate the speech engine for interaction with the user by speech (S130).

The washing machine 100 may then receive speech from the user and then perform natural language processing of the speech (S140). For example, the user may want to add one more rinse to the previously scheduled washing course, and utter "Add one more rinse" after a speech engine activating signal ("ding") from the washing machine 100.

The speech engine of the washing machine 100 converts the received speech into text and comprehends the meaning of the text to generate a corresponding command signal. In the above-described example, the washing machine 100 may add one more rinse to the washing course. Further, the washing machine 100 may form a text of "One more rinse has been added" to notify the user of the addition of one rinse cycle, and convert the text into a voice signal.

In the embodiment of FIG. 2, each time the user wants to control the washing machine 100 via speech, the user needs to utter a wake-up word. Accordingly, if the washing machine 100 were able to judge that the user wants to interact with the washing machine 100 and activate the speech engine without the user having to utter the wake-up word, more natural interaction would be enabled without requiring performance of the steps of uttering and recognizing the wake-up word.

Specifically, among home appliances, when there are many related options in addition to course selection (course, water temperature, number of times, additional functions, and the like), as is the case for the washing machine 100, if intervention of the wake-up word is required, interaction between the user and the device via speech may be difficult.

In the embodiment of the present disclosure, the washing machine 100 can determine whether the user intends to manipulate the washing machine 100 based on vision information and thereby activate the speech module, and interaction between the user and the washing machine 100 via speech can take place. Therefore, according to the embodiment of the present disclosure, the user may be provided with a smooth experience, without requiring additional uttering and recognizing of the wake-up word.

Figure 3:
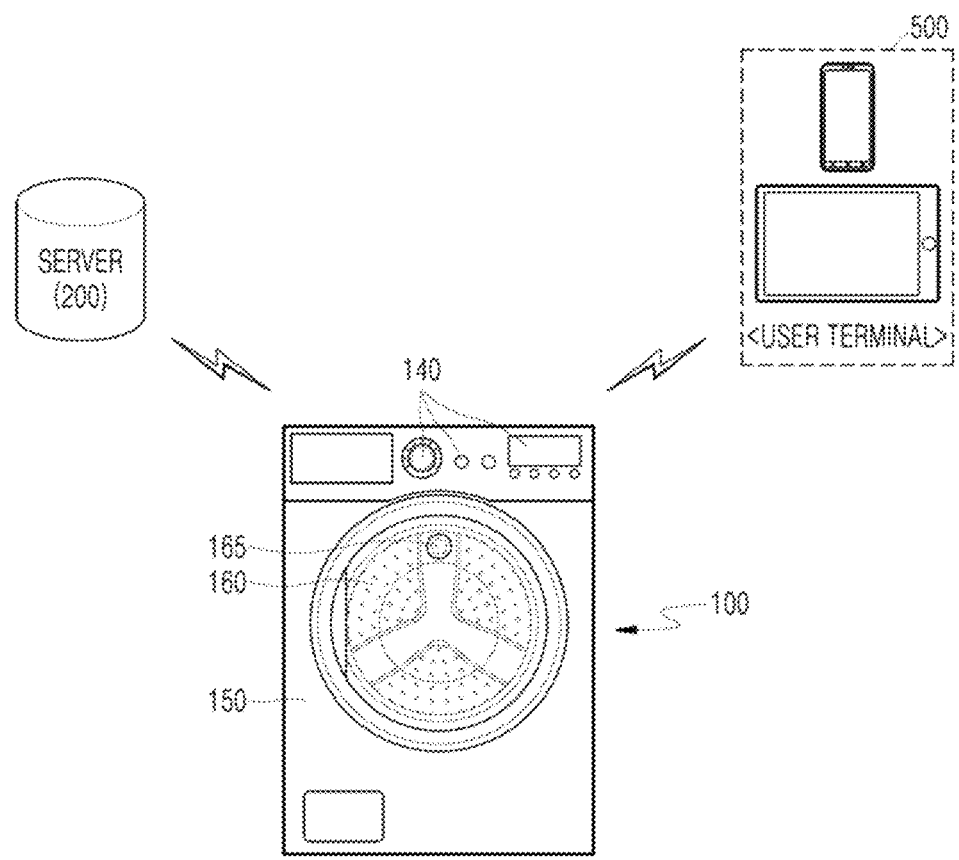
FIG. 3 illustrates an environment in which a washing machine according to an embodiment of the present disclosure communicates with a server and a user terminal.

FIG. 3 illustrates an environment in which a washing machine according to an embodiment of the present disclosure communicates with a server and a user terminal.

The washing machine 100 may include a user interface 140 which allows the user to interact with the washing machine 100, a cabinet 150 which forms an exterior of the washing machine 100, a door 160 installed to open and close a passage through which objects (for example, laundry) are loaded in the cabinet 150, and a camera 165 disposed on the door 160 to capture an image of the outside of the washing machine 100.

The user interface 140 may include a jog shuttle which may determine one among predetermined washing courses, a button which adjusts a time and a number of times, a display which visually provides washing-related information, a speaker which acoustically outputs washing-related information, and a microphone which collects external speech.

The user may transmit a command to the washing machine 100 through the user interface 140, and the washing machine 100 may also transmit information to the user through the user interface 140.

The cabinet 150 is a case which forms the exterior of the washing machine 100, and may include therein a washer tub (for example, an external tub and an internal tub), a motor which rotates the washer tub, a processor which controls the washing operation, and a memory connected to the processor.

Objects loaded in the cabinet 150 may be laundry loaded into the washer tub in the cabinet 150, and an opening may be formed in a part of the cabinet 150 through which the laundry is loaded into the washer tub of the cabinet 150.

The door 160 may be rotatably disposed on the washing machine 100 to open and close the passage through which the object is loaded through the opening of the cabinet 150. The camera 165 may be disposed at an upper portion of the door 160 to capture an image of the outside of the washing machine 100.

The camera 165 is disposed to face the outside, rather than the inside of the washing machine 100, so as to capture a motion of a user in the vicinity of the washing machine 100.

The camera 165 may be selected from various cameras, such as a 2D camera, a 3D camera, a stereo camera, or an infrared camera.

Although not illustrated in FIG. 3, the washing machine 100 may include one or more processors, a memory connected to the processor, and a communication interface.

The washing machine 100 may communicate with an external server 200 through a communication interface. The washing machine 100 may be supported by the external server 200 to recognize an object in the image, identify an intention of the user through image analysis, perform natural language processing of the user's speech, and search for a response for a query of the user.

Further, the washing machine 100 may communicate with the user terminal 500 through the communication interface. The washing machine 100 may transmit a notification regarding an event occurring during the washing to the user terminal 500, and receive an indication regarding an operation of the washing machine from the user terminal 500.

Figure 4:
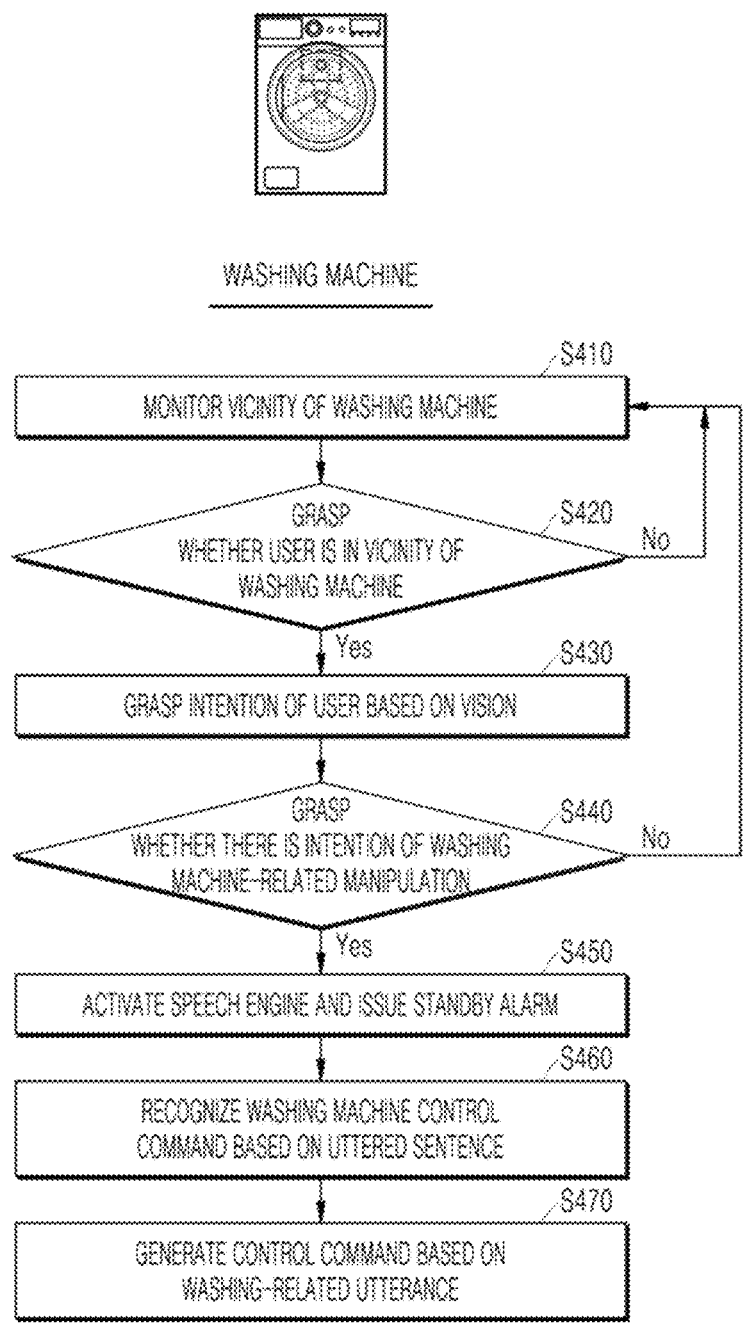
FIG. 4 is a flowchart for explaining a method for controlling a washing machine according to an embodiment of the present disclosure.

FIG. 4 is a flowchart for explaining a method for controlling a washing machine according to an embodiment of the present disclosure.

The processor of the washing machine 100 may monitor the vicinity of the washing machine 100 using the camera 165 or a proximity sensor (S410). The processor of the washing machine 100 may identify whether there is a user in the vicinity of the washing machine 100 through a captured image of the vicinity of the washing machine 100 or a signal sensed by the proximity sensor (S420).

When there is no user in the vicinity of the washing machine 100, the area around the washing machine 100 may be continuously monitored through the proximity sensor or the camera 165.

When there is a user in the vicinity of the washing machine 100, an image analysis module is activated to identify an intention of the user based on vision information including a motion of the user (S430).

If the intention of the user understood or identified based on the motion of the user is not related to the manipulation of the washing machine 100 (S440), the processor of the washing machine 100 continuously monitors the area around the washing machine 100 but does not activate the speech engine.

If it is determined that the intention of the user identified based on the motion of the user is related to the manipulation of the washing machine 100 (S440), the processor of the washing machine 100 may activate a speech engine and generate an alarm signal indicating that it is standing by to receive speech from the user (S450). The alarm signal may be implemented as a sound or an optical signal.

In order to determine whether the intention of the user includes an intention related to the manipulation of the washing machine 100, a vision-based user intention identifying neural network model trained in advance to determine an intention of a user in an image through the image may be used.

The neural network may be a trained model which is trained to identify an object (user) in the input image and trained in advance to determine a user's intention through the motion of the user in the image.

During the training phase, first, training data including images of a moving user in which the intention of the user is labelled are prepared, and an initial neural network model designed to be trained for image analysis is prepared.

Here, there may be two types of labels, respectively indicating whether the user intends or does not intend to manipulate the washing machine. However, more specifically, there may also be a plurality of types of labels, respectively related to which specific operation the user intends the washing machine to perform.

In the case of the washing machine, such labels may be created to be related to an available operation of the washing machine, in the case of a dryer, the labels may be created to be related to an available operation of the dryer, and in the case of a dish washer, the labels may be created to be related to an available operation of the dish washer.

When an initial neural network model is subjected to supervised learning using the above-described training data, the neural network model generated by the training may predict, through the motion of the user in the image, whether the user intends or does not intend to manipulate the home appliance, or more specifically, how the user intends to manipulate the home appliance.

In another embodiment, whether the user intends or does not intend to manipulate the home appliance or the washing machine 100 through the image analysis may be identified using an object recognizing neural network that is trained in advance and a predetermined rule.

For example, the object recognizing neural network trained in advance may be trained to identify the user from the image. The object recognizing neural network may be adjusted to recognize the user of the washing machine 100 through user image registration using a camera at the time of initial installation.

In one example, the predetermined rule may be a speed at which the user identified by the object recognizing neural network approaches the washing machine 100. After recognizing the user in the vicinity of the washing machine 100, when the user approaches the washing machine 100 at a predetermined speed or higher (for example, 70 cm/s or a height of the user—100 cm/s), the processor of the washing machine 100 may determine that the user intends to manipulate the washing machine 100.

For example, a step of identifying the intention of the user based on the motion of the user by the processor of the washing machine 100 may include a step of identifying the user from the captured image, a step of determining an approaching speed of the identified user approaching the washing machine, and a step of determining that the user intends to manipulate the washing machine when the approaching speed is equal to or higher than the predetermined speed.

Here, the approaching distance per second may use a fixed distance such as 70 cm, for example, as a reference. However, the approaching distance per second may also be set to vary depending on the user. For example, the approaching distance per second may be set to be a distance corresponding to a predetermined proportion of the height of the user (using information extracted from the captured image or previously registered) or a distance obtained by subtracting a predetermined value (for example, 100 cm) from the height of the user.

A movement distance of the user may be determined using 3D information acquired by a stereo camera, or may be determined by extracting a distance from an image acquired by a 2D camera.

Further, the approaching speed may be determined using a proportion of the image acquired by the 2D camera that is occupied by an object identified as a user. For example, after initially identifying the user by the image analysis, when the proportion of the image occupied by the user changes at a predetermined speed or higher (for example, the proportion of the total image occupied by the user changing at a speed of 15% per second or higher), the processor of the washing machine 100 may determine that the user intends to manipulate the washing machine 100.

This method may be adopted under the assumption that when the user intends to use the washing machine 100, the user directly approaches the washing machine 100, and when the user has another intention other than using the washing machine 100, the user may move in another direction.

When it is determined that the user intends to use or manipulate the washing machine 100 and a standby alarm signal is issued, the user may recognize that the washing machine 100 is ready to interact with the user via speech.

In this case, the user may start a conversation with the washing machine 100 without using the wake-up word by saying, for example, "Please prepare for duvet washing", and the washing machine 100 may identify meaning of the uttered sentence received through the activated speech module and recognize a control command corresponding to the meaning of the uttered sentence (S460).

According to the above-described example, the processor of the washing machine 100 may recognize "Please prepare for duvet washing" as a control command to select a duvet washing mode as a washing course, and generate a control command to set the duvet washing mode (S470).

The washing machine 100 may determine the duvet washing mode as the washing course in accordance with the control instruction generated by the processor and perform the washing course in accordance with the determined course after the laundry is loaded into the washing machine 100.

Figure 5:
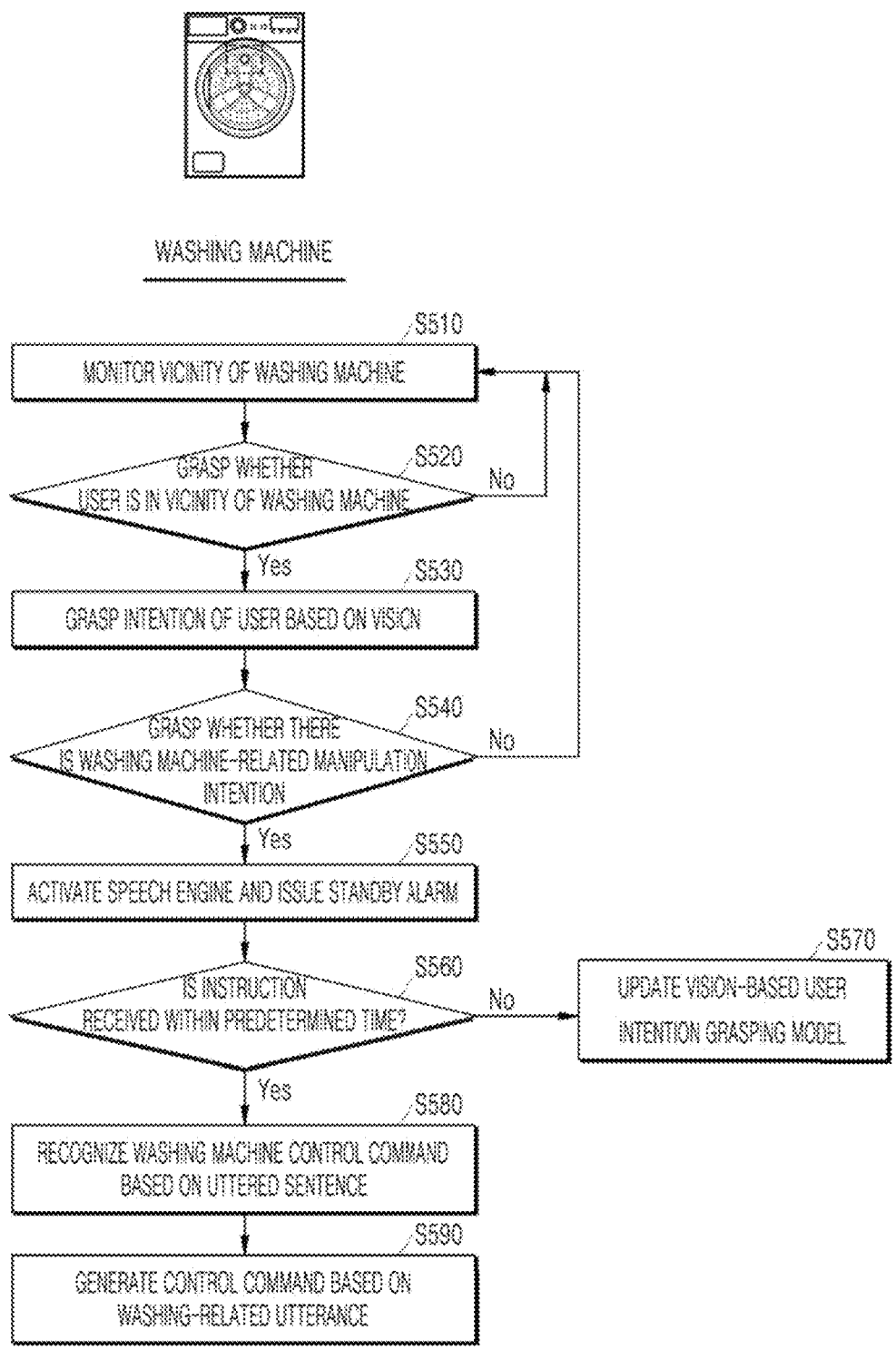
FIG. 5 is a flowchart for explaining an example of updating a vision-based user intention identifying model of a washing machine according to an embodiment of the present disclosure.

FIG. 5 is a flowchart for explaining an example of updating a vision-based user intention identifying model of a washing machine according to an embodiment of the present disclosure.

An operation of the washing machine processor in FIG. 5 is similar to that in FIG. 4, but further includes an operation in response to a washing machine manipulating command not being received from the user within a predetermined time after the speech engine is activated and the standby alarm is issued.

Hereinafter, redundant description for the same operations as those in FIG. 4 will be omitted, and only parts that are different therefrom will be described.

The washing mashing 100 may monitor the vicinity of the washing machine 100 (S510), grasp whether the user is in the vicinity of the washing machine 100 (S520), if the user is not in the vicinity of the washing machine 100, the washing machine may continuously monitor the vicinity of the washing machine 100, and when there is a user in the vicinity of the washing machine 100, an image analysis module is activated to identify an intention of the user based on vision information including a motion of the user (S530).

After determining that the user intends to manipulate the washing machine 100, the washing machine processor activates the speech engine and issues a standby alarm (S550), and then waits for a command or a query from the user for a predetermined time (for example, one minute).

The processor may determine whether there is a command or a query from the user via speech or touch within the predetermined time (S560), and if there is no command or query, the washing machine processor may determine that the intention of the user was erroneously identified.

Accordingly, the washing machine processor may update the vision-based user intention identifying neural network model that was used to identify the intention of the user by analyzing the image (S570).

The washing machine processor may recognize a washing machine control command based on an uttered sentence (S580) and if the uttered sentence is washing-related, then generate a control command based on the washing-related utterance (S590).

In one embodiment, the updating may involve labeling the image from which it was erroneously determined that the user intends to use the washing machine as an image in which the user does not intend to use the washing machine, and retraining the neural network using the newly labeled image and the previous training data.

In another embodiment, the updating may involve extracting features from the image from which it was erroneously determined that the user intends to use the washing machine, and adjusting the neural network such that the neural network determines that the user does not intend to use the washing machine when the corresponding feature is detected.

The updating may be performed whenever erroneous determination occurs, or may be performed after collecting a predetermined number or more of cases of erroneous determination.

Through the above-described updating, the washing machine 100 of the present disclosure may more accurately identify the intention of the user. Further, the updating is performed in each different user environment, such that individual washing machines 100 may be readjusted by a method that is more suitable for the corresponding user in the user environment.

Figure 6:
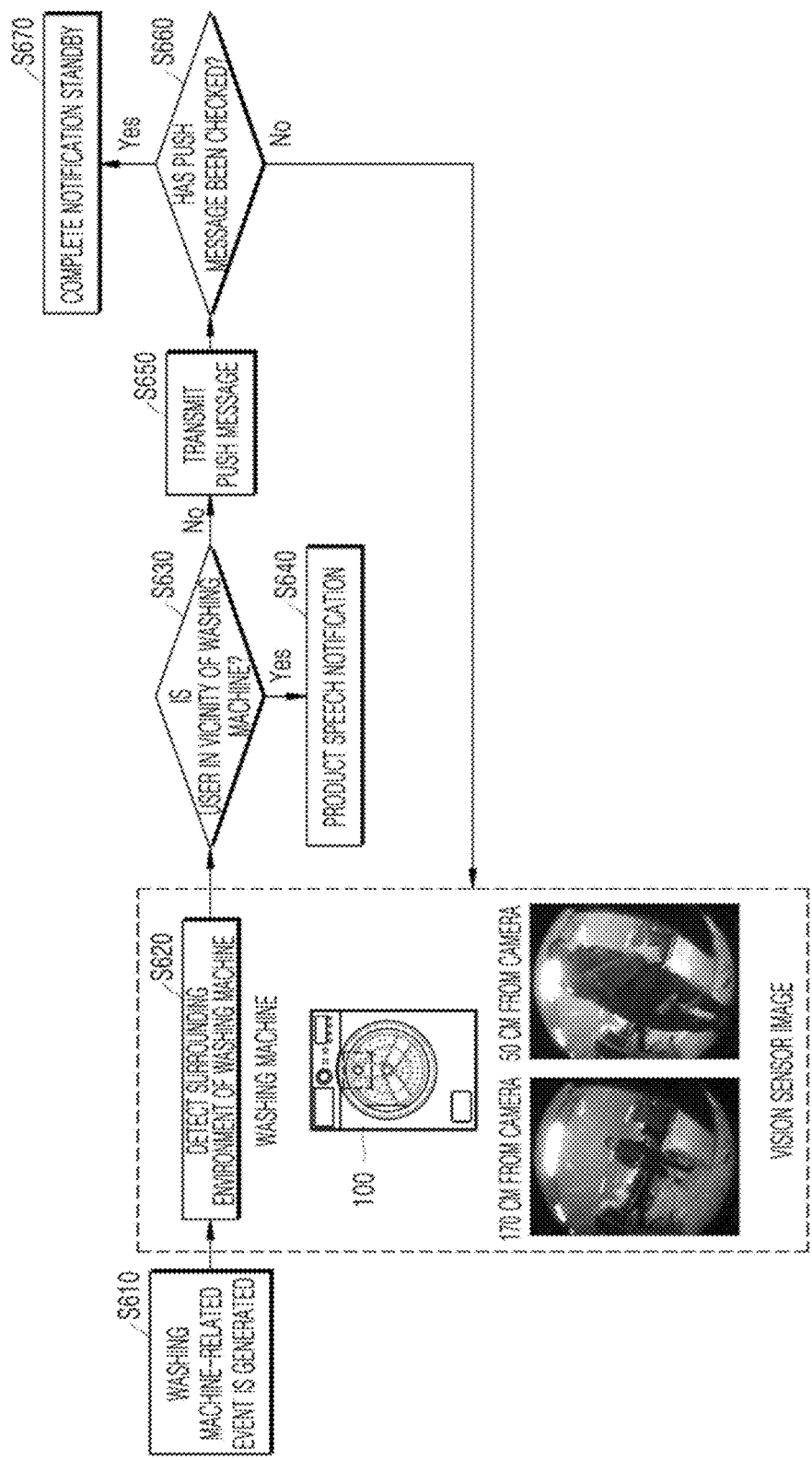
FIG. 6 is a flowchart for explaining an operation of a washing machine when an event occurs during operation of a washing machine according to an embodiment of the present disclosure.

FIG. 6 is a flowchart for explaining an operation of a washing machine when an event occurs during operation of a washing machine according to an embodiment of the present disclosure.

In home appliances such as the washing machine 100 that have many dynamic motions, errors may arise during the operation thereof. In this case, when the user does not stay in the vicinity of the home appliances, the error occurrence may not be recognized in a timely manner.

Further, even when an error occurrence is recognized, it cannot be confirmed which operations had been performed by the home appliance before the error occurred. Accordingly, it is difficult for the user to determine which operation of the home appliance needs to be performed once the cause of the error is removed.

Therefore, when an error occurs, it may be the case that all previous operations are ignored and all processes are repeated again from the beginning.

For example, when an error occurs during spin-drying after the washing machine 100 has finished water supplying, washing, and rinsing, a user who is not in the vicinity of the washing machine 100 may recognize this error later. Further, since the user may not know which washing courses have been performed by the washing machine 100, the user may repeat the water supplying, washing, and rinsing for laundry which has already been rinsed.

In the embodiment of the present disclosure, an event (for example, the washing machine becoming seriously unbalanced due to unequally distributed laundry) may occur.

The processor of the washing machine 100 may recognize occurrence of the event (S610), and monitor/detect the surrounding environment of the washing machine 100 using the camera 165 or a proximity sensor (S620).

Further, after recognizing the occurrence of the event, the washing machine 100 may store information about the event in the memory. When the event is an error which occurs during the operation of the washing machine 100, the information about the event may include information about a type of the error and a history of the operations performed by the washing machine 100 until the time at which the error occurred.

Further, the processor of the washing machine 100 may determine the type of the error and search for a solution for the error type after recognizing the occurrence of the event.

The error type may be determined based on an operation status detected from the washing machine 100 (for example, the washer tub stopping spinning, the washing machine being tilted, or erroneous current supply) and a type of component for which an abnormal state is detected.

In order to determine the error type, an error detecting neural network which is trained in advance with training data in which changes of various parameters in the washing machine 100 and types of error indicated by the changes are matched to each other may be used.

After determining an error type, the washing machine 100 may search for a solution for the error type. In one embodiment, the solution may be searched for by searching a table stored in the memory of the washing machine 100 in which solutions are matched to individual error types.

In another embodiment, the solution may be searched for by providing a query about a solution for the error type that has occurred to the external server 200, and receiving a solution for the error type from the external server 200.

Here, the external server 200 may have a database in which a solution to an issue corresponding to each type of error is stored. Further, the external server 200 may continuously receive updated issue solutions from the manufacturer of the washing machine.

Further, the external server 200 may communicate with various washing machines, and collect information about error occurrence situations and solving processes so as to generate or upgrade a neural network model which can autonomously estimate a solution for each type of error.

After detecting occurrence of the event, the washing machine processor may determine whether there is a user in the vicinity of the washing machine 100 through the proximity sensor or the camera 165 (S630), and when there is a user in the vicinity of the washing machine, the washing machine processor may generate a voice notification through a speaker in the washing machine (S640).

For example, the washing machine 100 includes information about the operation history of the washing machine 100 until the time at which the error occurred and an error type, and may perform voice guidance of "An error occurred due to imbalance of the washing machine during the spin-drying step after washing and rinsing". Additionally, the washing machine 100 may suggest a solution to the issue by performing voice guidance of "Please balance the washing machine".

Further, the event occurring during the operation of the washing machine may be operation completion of the washing machine 100. In this case, the information about the event may include information about a time at which the operation of the washing machine 100 was completed.

For example, if laundry still remains in the washing machine 100 after all washing operations of the washing machine 100 have been completed, the laundry may develop an odor depending on an internal environment condition of the washing machine or a time for which the laundry has remained inside the washing machine.

Therefore, when the washing operation has been completed, the processor of the washing machine 100 may determine an operation to be recommended to the user based on the time that has elapsed since the time at which the operation was completed using information about the completion time, and generate the recommended operation as a voice signal.

For example, when the user approaches the washing machine 100 after one hour has elapsed since the completion of the washing, the processor of the washing machine 100 recommend that the user performs the rinsing operation again.

By contrast, when there is no user in the vicinity of the washing machine, the washing machine 100 may transmit a push message including information about the event to a user terminal 500 which is registered in advance in the washing machine 100 (S650) instead of performing the voice guidance through the speaker.

After transmitting the push message, the washing machine 100 may confirm whether the user has read the information about the event transmitted to the user terminal 500 in the user terminal 500 (S660).

In order to confirm that the user has read the information in the user terminal 500, the processor of the washing machine 100 may configure the push message such that a confirmation message is transmitted to the washing machine 100 when the push message is read in the user terminal 500.

If it is confirmed that the push message has been read in the user terminal 500, when the user approaches the washing machine 100 later, the processor may complete the notification standby and not transmit the content transmitted through the push message via speech again (S670). That is, once the processor has confirmed that the push message has been checked, the processor will complete the notification standby.

However, if it is confirmed that the push message has not been read in the user terminal 500, when the user approaches the washing machine 100 later, the washing machine processor may generate information about the event as a voice signal, and output the voice signal through the speaker.

Figure 7:
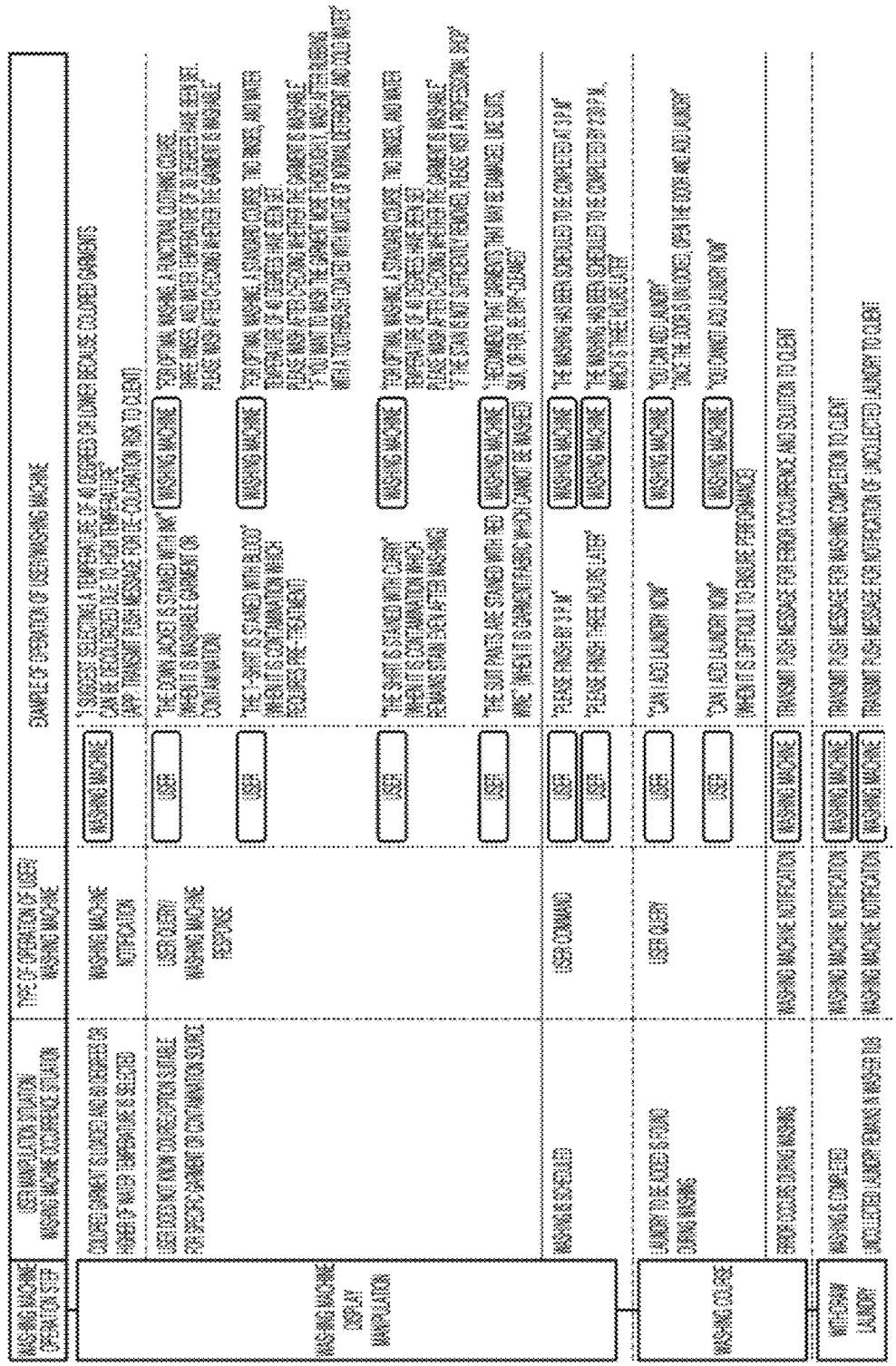
FIG. 7 is an example in which a user interacts with a washing machine according to an embodiment of the present disclosure.

FIG. 7 is an example in which a user interacts with a washing machine according to an embodiment of the present disclosure.

In all cases of FIG. 7, when the user approaches the washing machine 100 while holding laundry, the washing machine 100 may determine that the user intends to manipulate the washing machine 100 through vision information, and activate the speech module to cause the speech module to enter a mode in which the speech interaction is possible.

In a first case among the cases illustrated in FIG. 7, the processor of the washing machine 100 may not only analyze the motion of the user, but also determine a type of laundry to be loaded through the vision information acquired by the camera 165.

Accordingly, the processor of the washing machine may determine whether the user is loading a colored garment, and then sense that the user is selecting a water temperature of 60 degrees or higher in accordance with the speech command of the user or manipulation of a touch display.

In the above-described case, the washing machine 100 may output voice guidance or transmit a message saying that "I suggest selecting a temperature of 40 degrees or lower because colored garments can be decolorized due to high temperature", based on a predetermined washing rule that colored garments need to be washed at a predetermined temperature or lower.

A second case among the cases illustrated in FIG. 7 is a case in which the user does not know an appropriate course and option for a garment to be washed. In this case, the user may make an utterance of "The down jacket is stained with ink", "The t-shirt is stained with blood", "The shirt is stained with curry", or "The suit pants are stained with red wine".

Since the washing machine 100 is ready to interact with the user via speech based on the vision information, even without a specific wake-up word being used by the user, the washing machine 100 may recognize the utterance and output an appropriate response via speech. That is, the washing machine 100 may recommend an optimal washing method for each case.

A third case among the cases illustrated in FIG. 7 is a case in which the user wants to make a schedule for washing and requests a time at which the washing is to be completed, such as "Please finish by 3 p.m." or "Please finish three hours later".

Accordingly, the washing machine 100 may adjust the washing course to finish the washing by the desired time of the user, and via speech may notify the user that the adjustment has been performed.

A fourth case among the cases illustrated in FIG. 7 is a case in which the user finds additional laundry to be added while the washing course is being performed. In this case, the user may provide a query to the washing machine 100 asking "Can I add laundry now?"

In this regard, if it is possible to add the laundry, the washing machine 100 may answer "You can add laundry. Once the door is unlocked, open the door and add laundry."

In contrast, if it is not possible to add the laundry, the washing machine 100 may answer "You cannot add laundry now."

A fifth case among the cases illustrated in FIG. 7 is a case in which an error occurs while the washing course is being performed. In this case, the washing machine 100 may transmit, to the user terminal, a push message indicating that the error has occurred and a solution for the error.

A sixth case among the cases illustrated in FIG. 7 is a case in which the washing is completed, or uncollected laundry remains in the washer tub. In this case, the washing machine may transmit, to the user terminal, a push message notifying the user of the state.

Figure 8:
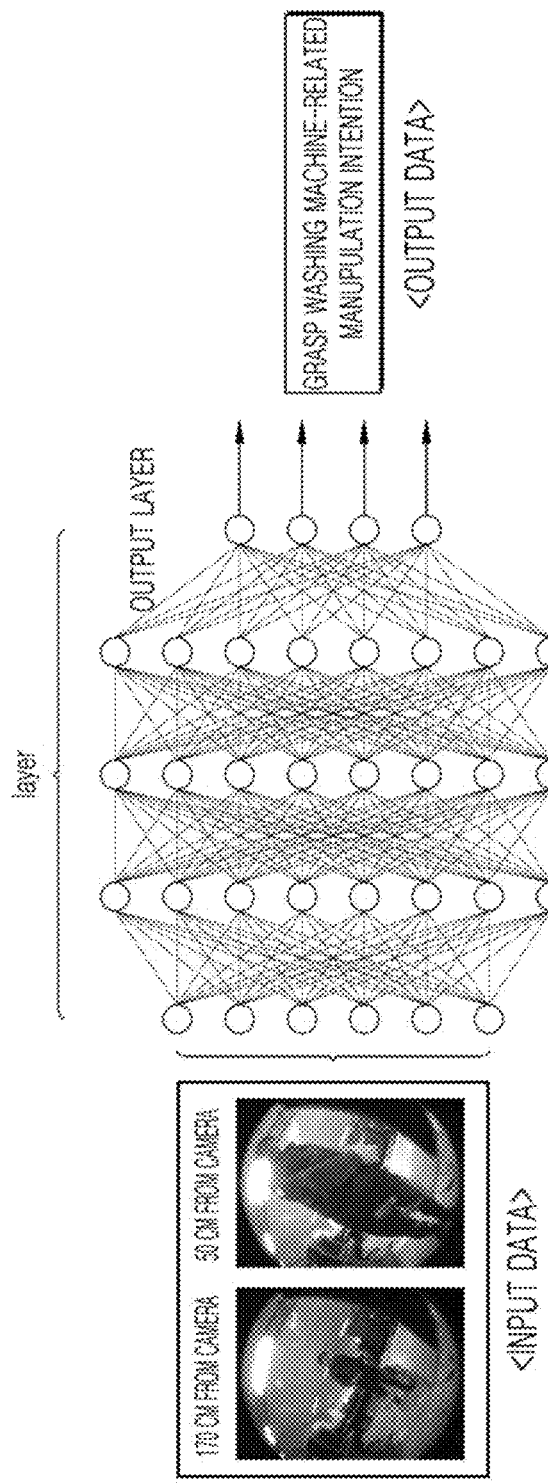
FIG. 8 is a view for explaining a vision-based user intention identifying model used for a washing machine according to an embodiment of the present disclosure.

FIG. 8 is a view for explaining a vision-based user intention identifying model used for a washing machine according to an embodiment of the present disclosure.

In one embodiment, the processor of the washing machine may use a neural network to identify the user's intention based on a captured image.

A developer of the washing machine may first collect various images in the vicinity of washing machines and label each image with a washing machine manipulation intention of the user. When a sufficient amount of training data is prepared by this process, a pre-designed initial neural network model may be trained using a supervised learning method.

The neural network model generated by the training may identify the manipulation intention of the user regarding the washing machine.

In another embodiment, the inputted images may be images showing an identified user moving from a first distance (for example, 170 cm) to a second distance (for example, 50 cm) from the camera of the washing machine 100, and whether the user intends or does not intend to manipulate the washing machine may be determined depending on the time taken for this movement.

While the above-described embodiments are described with reference to a washing machine, technical elements of the present disclosure described in the embodiments may be applied in the same manner to a plurality of home appliances into which an object is inserted to be processed.

The exemplary embodiments described above may be implemented through computer programs executable through various components on a computer, and such computer programs may be recorded in computer-readable media. In this case, examples of the computer-readable media may include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program instructions, such as ROM, RAM, and flash memory devices.

The computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present application (especially in the appended claims), the terms "a/an" and "the" include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

The order of individual steps in process claims according to the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations may be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A method of controlling a home appliance, the home appliance including:
  a camera;
  a speech engine processor for natural language processing;
  a speaker;
  a microphone;
  a memory; and
  a controller including a processor,
  the method comprising:
    monitoring, via the camera, a predetermined area around the home appliance;
    determining, via the controller, whether there is a user in the predetermined area around the home appliance based on the monitoring of the predetermined area by the camera;

capturing, via the camera, motion of the user, when the controller determines that the user is in the predetermined area around the home appliance;

identifying, via the controller, an intention of the user based on the captured motion; and activating the speech engine processor based on the intention of the user, wherein the identifying the intention of the user includes using a neural network model trained to determine whether the user intends to manipulate the home appliance based on the motion, captured by the camera, of the user in the predetermined area around the home appliance, and wherein the method further comprises:

after the activating the speech engine processor of the home appliance, determining, via the controller, that the identifying of the intention of the user using the neural network model has failed based on a command not being received by the home appliance for a predetermined time, labeling an image of the captured motion as training data in which the user does not intend to use the home appliance and updating the neural network model using the labeled image of the captured motion.

2. The method of controlling the home appliance of claim 1, further comprising:

before the determining, recognizing, via the controller, an event occurring during an operation of the home appliance; and storing, in the memory, information about the event, wherein the activating of the speech engine processor includes outputting, through the speaker, a voice signal of the information about the event.

3. The method of controlling the home appliance of claim 2, wherein the event comprises an error occurring during the operation of the home appliance, and wherein the information about the event includes information about a history of operations performed by the home appliance until a time at which the error occurred.

4. The method of controlling the home appliance of claim 3, further comprising:

after the recognizing of the event:

determining, via the controller, an error type of the error; and searching, via the controller, for a solution for the error type, wherein the information about the event further includes the solution for the error type, and wherein the voice signal output by the speaker includes the information about the history of the operations performed by the home appliance until the time at which the error occurred and the solution according to the error type.

5. The method of controlling the home appliance of claim 4, wherein the searching, by the controller, for the solution for the error type comprises:

providing, via the controller, a query about the solution for the error type to an external server that communicates with the home appliance; and receiving, via the controller, the solution for the error type from the external server.

6. The method of controlling the home appliance of claim 1, further comprising before the determining, recognizing, via the controller, an event involving completion of an operation of the home appliance; and storing, in the memory, information about the event, including a time when the completion of the operation of the home appliance occurred, wherein the activating of the speech engine processor of the home appliance includes:

determining, via the controller, an operation to be recommended to the user based on a time elapsed from the time at which the operation of the home appliance was completed; and outputting, via the speaker, a voice signal of the operation to be recommended.

7. The method of controlling the home appliance of claim 1, further comprising:

before the determining:

recognizing, via the controller, an event occurring during the operation of the home appliance; and storing, in the memory, information about the event; and after determining that there is no user in the predetermined area around the home appliance, transmitting the information about the event to a pre-registered user terminal.

8. The method of controlling the home appliance of claim 7, further comprising:

after the transmitting, confirming, via the controller, whether the user has read the information about the event; and outputting, via the speaker, a voice signal of the information about the event, in response to confirming that the user has not read the information about the event.

9. The method of controlling the home appliance of claim 1, wherein the neural network model is trained by a supervised learning method using training data in which images of a moving user are used as input data and the intention of the user is labelled in the corresponding image.

10. The method of controlling the home appliance of claim 1, further comprising:

recognizing a home appliance control command based on speech of a user; and generating the home appliance control command.

11. A home appliance, comprising:

a cabinet forming an exterior of the home appliance;

a door configured to open or close a passage through which an object is to be loaded into the cabinet;

a camera configured to capture an image of outside of the home appliance;

a speech engine processor;

a speaker configured to output a voice signal generated in the speech engine processor;

a controller configured to control the home appliance, the controller including a processor; and a memory connected to the controller, wherein the memory stores instructions configured to, when executed by the controller, cause the controller to:

determine whether there is a user in a predetermined area around the home appliance, capture, via the camera, a motion of the user when the controller determines that the user is in the predetermined area around the home appliance, identify an intention of the user based on the captured motion, and activate the speech engine processor in accordance with the intention of the user, wherein the memory stores a neural network model trained to determine whether the user intends to manipulate the home appliance based on the motion of the user in the predetermined area around the home appliance, wherein identifying the intention of the user is performed using the neural network model, and wherein the memory further stores instructions configured to, after the activating the speech engine processor of the home appliance, determine, via the controller, that the identifying of the intention of the user using the neural network model has failed based on a command not being received by the home appliance for a predetermined time, label an image of the captured motion as training data in which the user does not intend to use the home appliance and update the neural network model using the labeled image of the captured motion.

12. The home appliance of claim 11, wherein the memory stores instructions configured to, when executed by the controller, cause the controller to:

before the determining whether the user is in the predetermined area around the home appliance, recognize an event of the home appliance, and store information about the event in the memory, and wherein the activating the speech engine processor of the home appliance includes outputting, via the speaker, a voice signal of the information about the event.

13. The home appliance of claim 12, wherein the event comprises an error occurring during the operation of the home appliance, and wherein the information about the event includes information about a history of operations performed by the home appliance until a time at which the error occurred.

14. The home appliance of claim 12, wherein the event includes completion of an operation of the home appliance, wherein the information about the event includes time information about a time when the completion of the operation of the home appliance occurred, and wherein the activating the speech engine processor further includes determining, via the controller, a solution based on a time elapsed since the operation of the home appliance was completed, and generating, via the speaker, a voice signal of the solution.

15. The home appliance of claim 11, further comprising a proximity sensor configured to detect whether the user is in the predetermined area around the home appliance, wherein the camera is disposed on the door and faces a front direction of the home appliance, and wherein the memory stores instructions configured to, when executed by the controller, cause the controller to:

determine that the user is in the predetermined area around the home appliance based on the detection from the proximity sensor, and activate the camera in response to the proximity sensor sensing that the user is in the predetermined area around the home appliance.

16. The home appliance of claim 13, wherein the memory further stores instructions configured to, when executed by the controller, cause the controller to, after the operation of recognizing an event, determine an error type and search for a solution for the error type, wherein the information about the event includes the solution for the error type, and wherein the activating the speech engine processor further includes outputting, via the speaker, a voice signal of the information about a history of the operations performed by the home appliance until the time at which the error occurred and the solution for the error type.

17. The home appliance of claim 16, further comprising a communication interface configured to communicate with an external server, and wherein the searching for a solution for the error type includes:

providing a query about a solution for the error type to the external server through the communication interface, and receiving the solution for the error type from the external server.

\* \* \* \* \*